US012741638B2

(12) United States Patent
Iwase et al.

(10) Patent No.: US 12,741,638 B2
(45) Date of Patent: Sep. 22, 2026

(54) VEHICLE ACCELERATION CONTROL APPARATUS WITH INTERVENTION STOP AND CANCELLATION

(71) Applicant: SUBARU CORPORATION, Tokyo (JP)

(72) Inventors: Takuya Iwase, Tokyo (JP); Shinji Kato, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 160 days.

(21) Appl. No.: 18/575,269

(22) PCT Filed: Aug. 30, 2022

(86) PCT No.: PCT/JP2022/032533
§ 371 (c)(1),
(2) Date: Dec. 28, 2023

(87) PCT Pub. No.: WO2024/047731
PCT Pub. Date: Mar. 7, 2024

(65) Prior Publication Data
US 2025/0074412 A1 Mar. 6, 2025

(51) Int. Cl.
*B60W 30/14* (2006.01)
*B60W 50/02* (2012.01)
(Continued)

(52) U.S. Cl.
CPC ...... *B60W 30/143* (2013.01); *B60W 50/0205* (2013.01); *B60W 50/082* (2013.01);
(Continued)

(58) Field of Classification Search
CPC ........... B60W 30/143; B60W 50/0205; B60W 50/082; B60W 50/12
See application file for complete search history.

(56) References Cited

U.S. PATENT DOCUMENTS

2012/0209488 A1* 8/2012 Nagaya ................. B60W 10/06 701/70
2021/0237720 A1 8/2021 Chen et al.
(Continued)

FOREIGN PATENT DOCUMENTS

JP H08-223703 A 8/1996
JP 2009-156092 A 7/2009
(Continued)

OTHER PUBLICATIONS

Office Action dated Oct. 15, 2024, from corresponding Japanese Application No. 2023-578900, 6 pages.
(Continued)

*Primary Examiner* — Scott A Browne
*Assistant Examiner* — Josephine Rich
(74) *Attorney, Agent, or Firm* — Rimon P.C.

(57) ABSTRACT

A vehicle traveling control apparatus includes: an operation member configured to operate traveling of a vehicle; and a controller configured to execute a traveling control including an acceleration or deceleration control of accelerating or decelerating the vehicle in accordance with operation information regarding an operation on the operation member by an occupant. The controller executes an intervention stop control of decelerating and stopping the vehicle that is traveling, an intervention cancellation control of cancelling the intervention stop control, and a driving control of accelerating the vehicle. When an abnormal operation on the accelerator pedal is determined during the driving control, the controller cancels the intervention stop control, and then accelerates the vehicle by a second driving control that suppresses acceleration as compared with a first driving control of accelerating the vehicle in accordance with an operation amount on the operation member by the occupant.

6 Claims, 10 Drawing Sheets

(51) Int. Cl.
*B60W 50/08* (2020.01)
*B60W 50/12* (2012.01)

(52) U.S. Cl.
CPC ....... *B60W 50/12* (2013.01); *B60W 2540/106* (2013.01); *B60W 2540/18* (2013.01)

(56) References Cited

U.S. PATENT DOCUMENTS

| | | | | |
|---|---|---|---|---|
| 2021/0362715 | A1* | 11/2021 | Kim .................... | B60W 30/188 |
| 2023/0303071 | A1* | 9/2023 | Kobayashi ............... | B60Q 1/46 |

FOREIGN PATENT DOCUMENTS

| | | | | |
|---|---|---|---|---|
| JP | 2010-30396 | A | | 2/2010 |
| JP | 2012061932 | A | * | 3/2012 |
| JP | 2013129228 | A | * | 7/2013 |
| JP | 2013155632 | A | * | 8/2013 |
| JP | 2019-142266 | A | | 8/2019 |

OTHER PUBLICATIONS

International Search Report issued in International Application No. PCT/JP2022/032533, dated Nov. 22, 2022.

* cited by examiner

【FIG. 1】
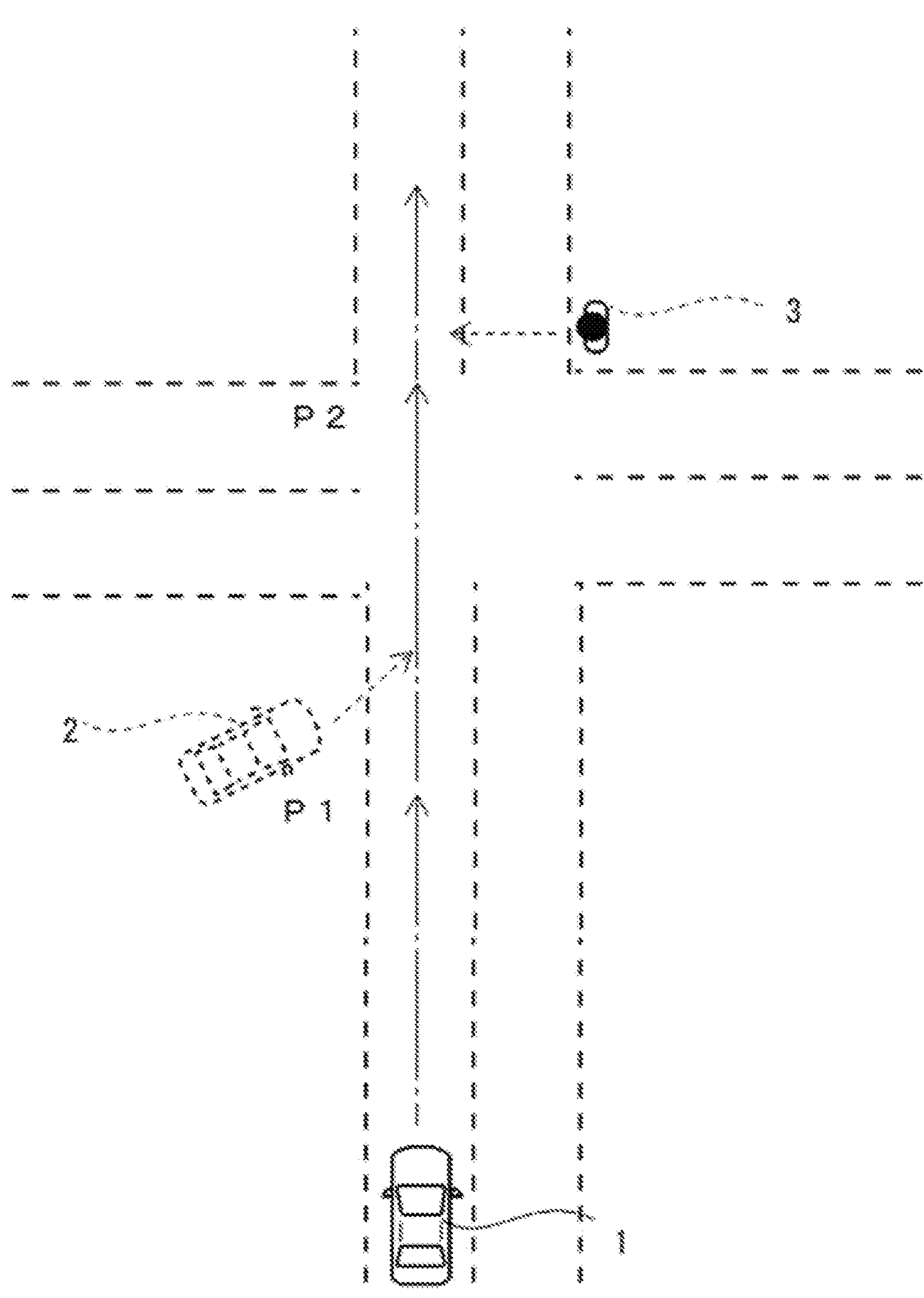

[ FIG. 2 ]
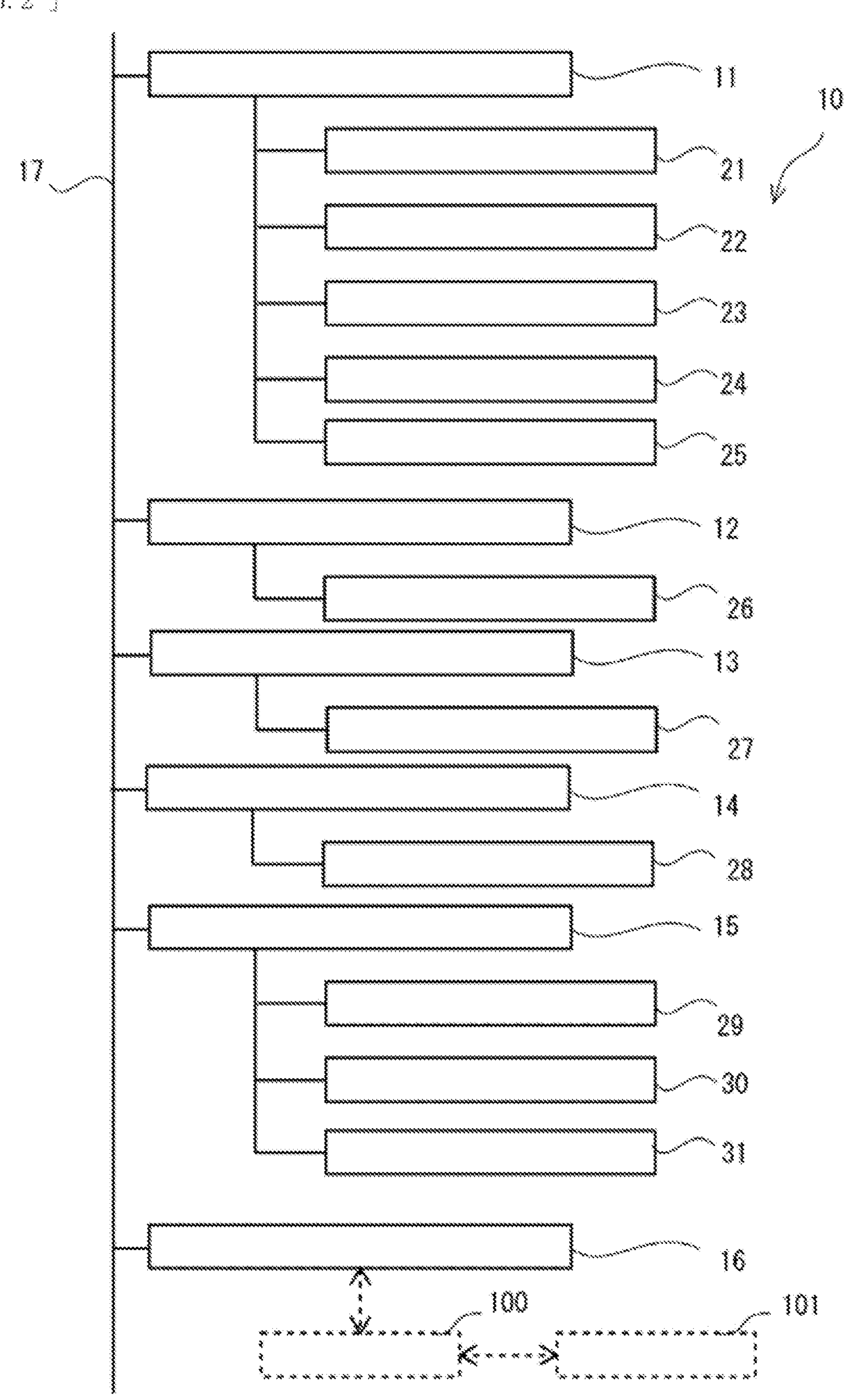

【FIG. 3】
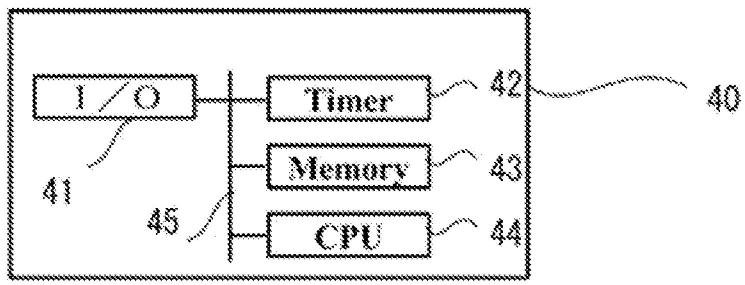
【FIG. 4】
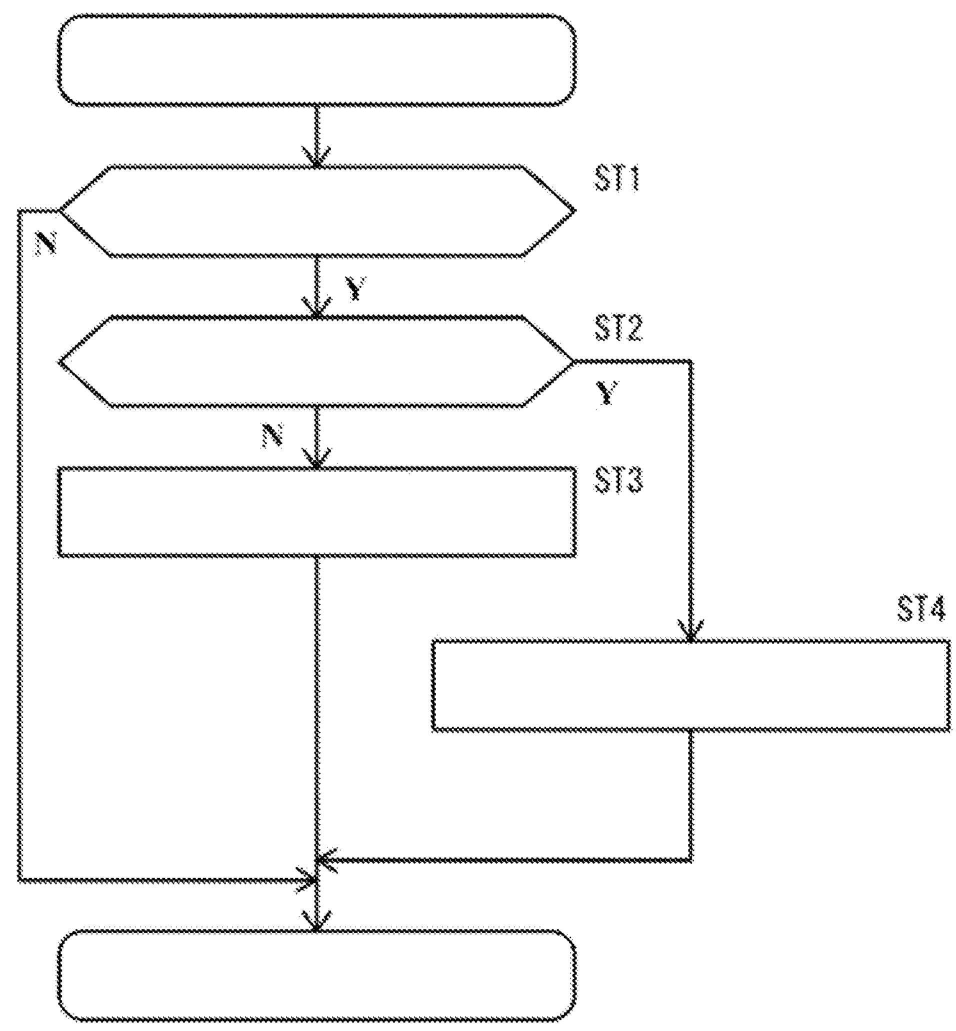

[ FIG. 5 ]
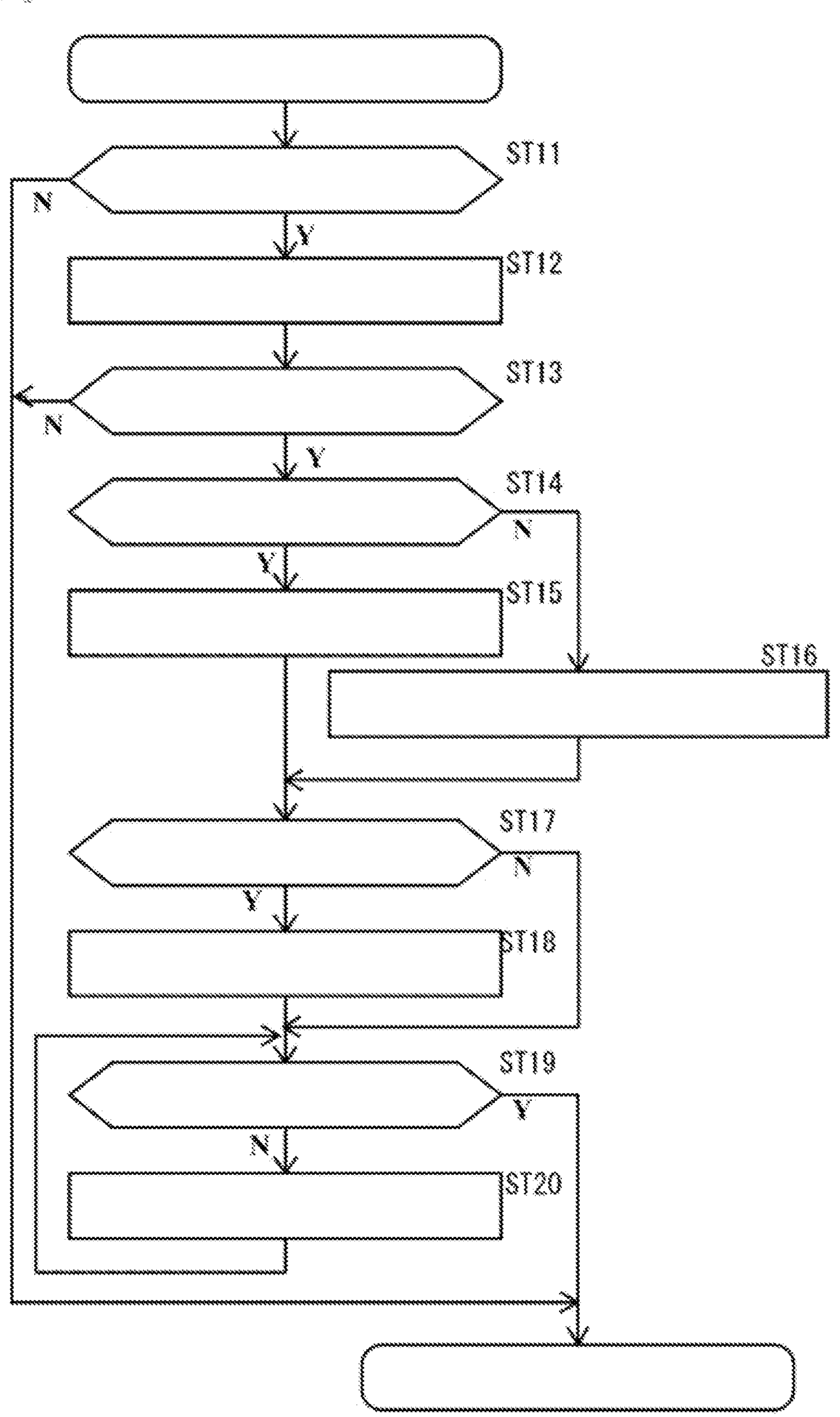

【FIG. 6】
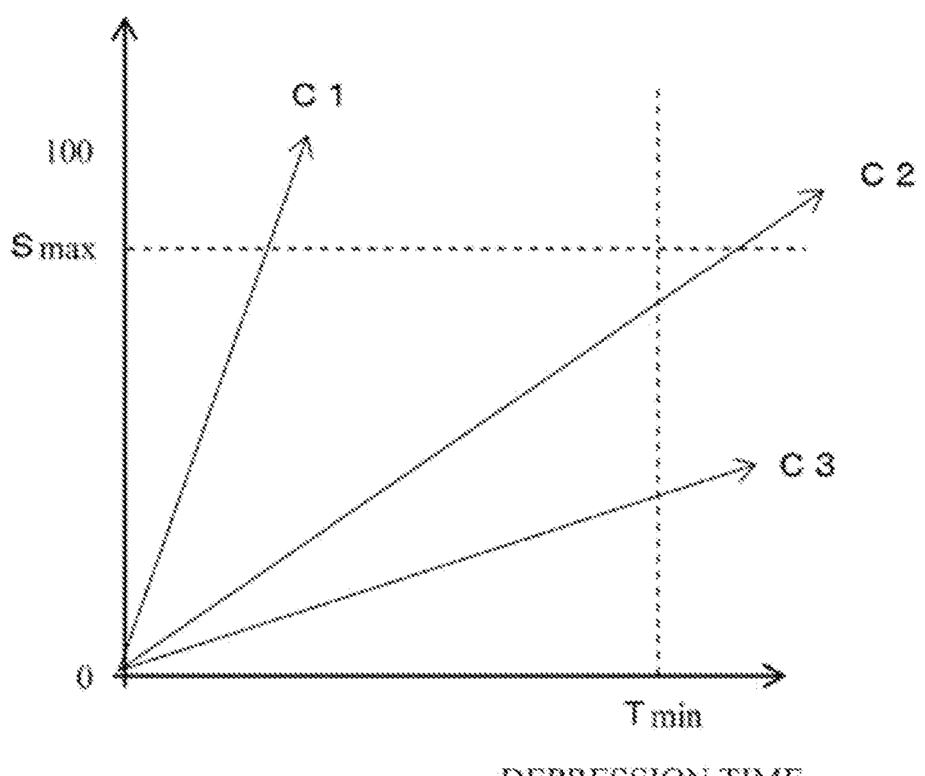

[ FIG. 7 ]
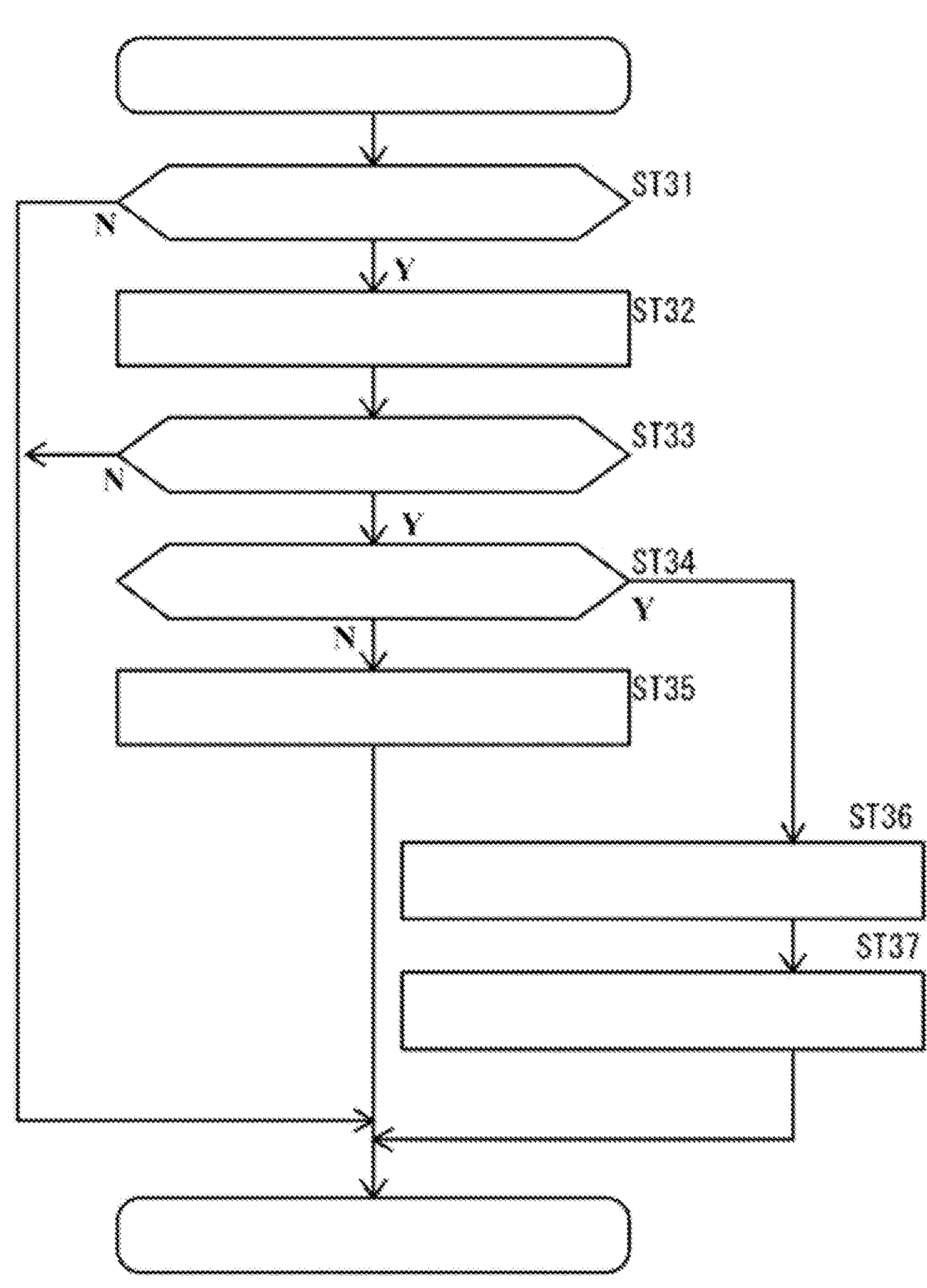

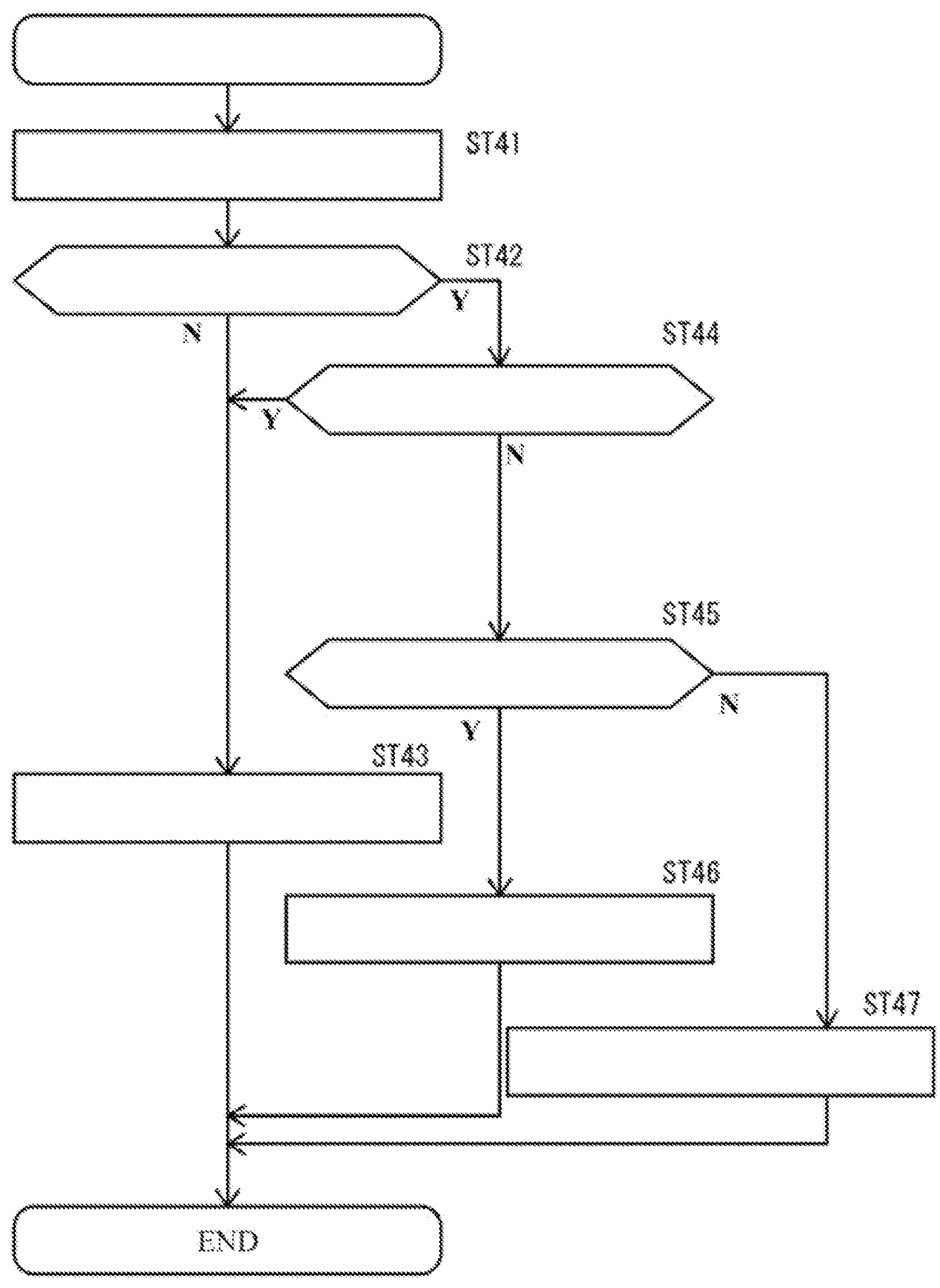
[ FIG. 8 ]
ST41
ST42
Y
N
ST44
Y
N
ST45
N
Y
ST43
ST46
ST47
END

〔 FIG. 9 〕
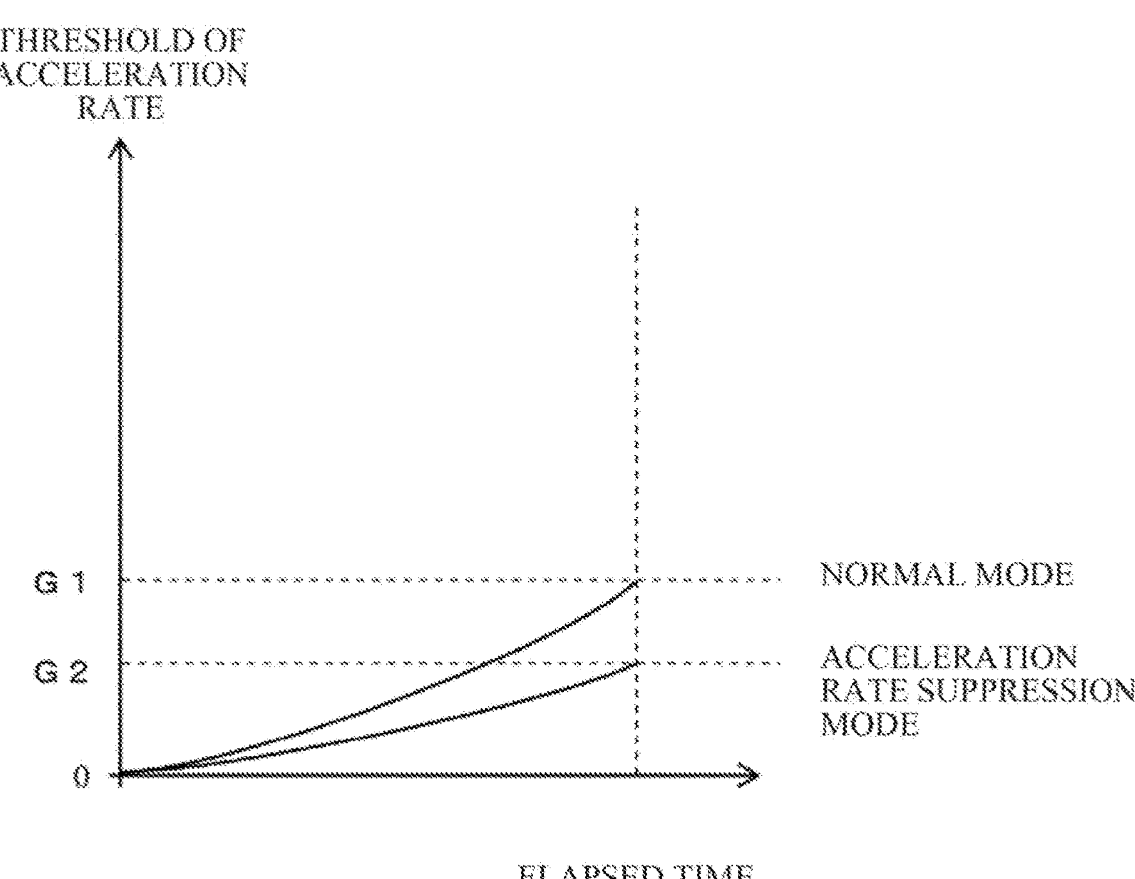

[ FIG. 10 ]
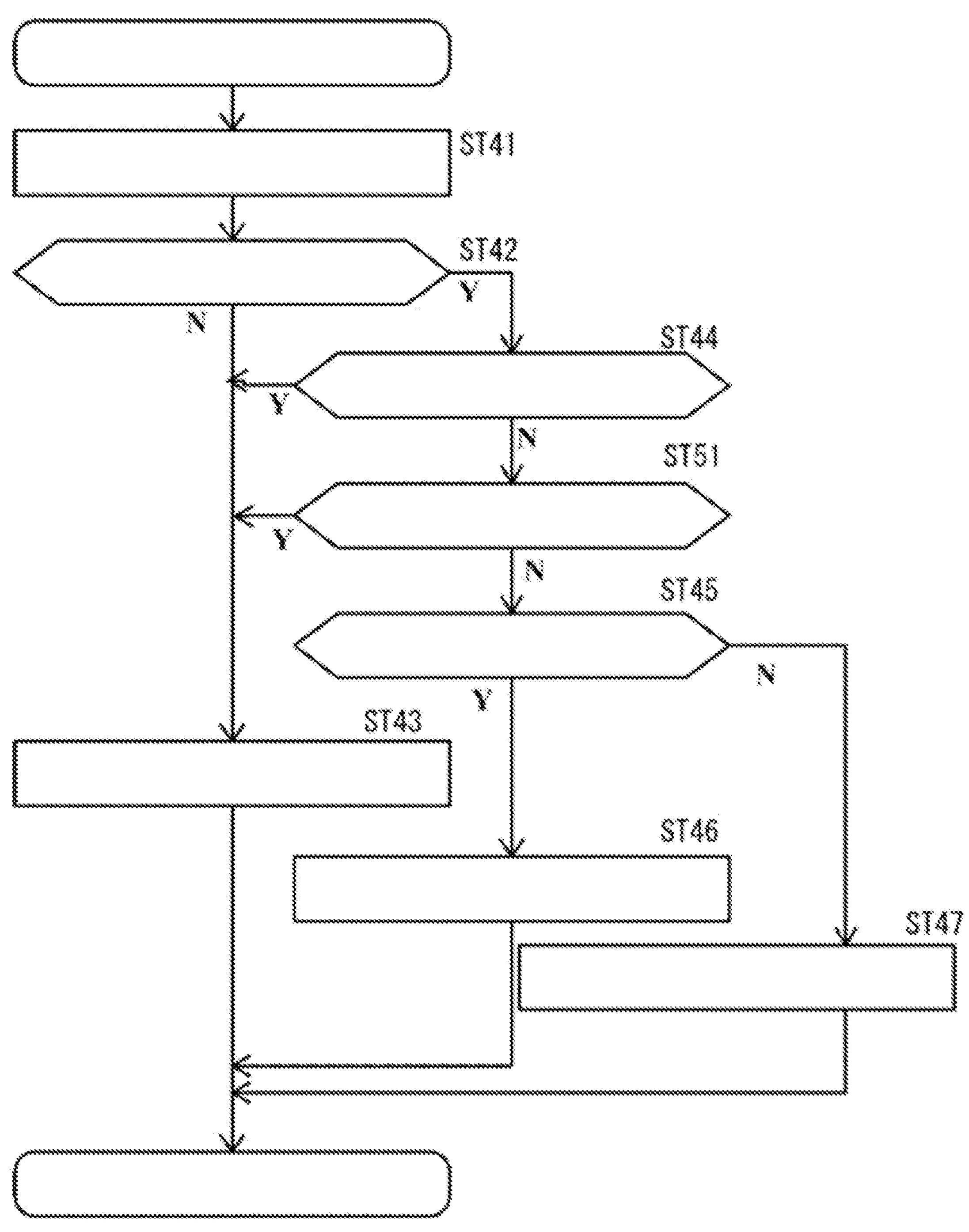

【 FIG. 11 】
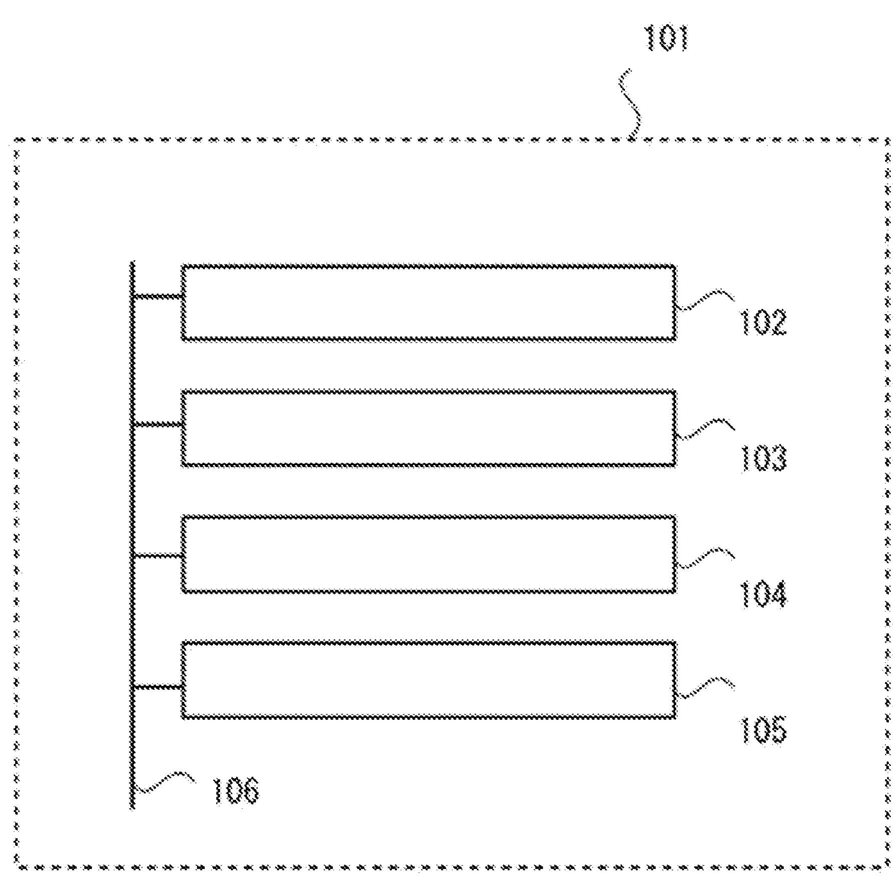

VEHICLE ACCELERATION CONTROL APPARATUS WITH INTERVENTION STOP AND CANCELLATION

CROSS-REFERENCE TO RELATED APPLICATIONS

This application is the U.S. National Phase under 35 U.S.C. § 371 of International Application No. PCT/JP2022/032533, filed on Aug. 30, 2022, the entire contents of which are hereby incorporated by reference.

TECHNICAL FIELD

The invention relates to a vehicle traveling control apparatus.

BACKGROUND ART

A vehicle such as an automobile travels in accordance with an operation input to an operation member, such as a steering wheel, an accelerator pedal, or a brake pedal, by an occupant.

However, the occupant is not always able to appropriately operate the operation member in the traveling vehicle. In such a case, it is considered desirable for the vehicle to give priority to intervention by control, and temporarily suppress control based on the occupant's operation, to exhibit a safer vehicle behavior (Patent Literature 1). For example, the occupant can mistakenly operate the accelerator pedal as the brake pedal. In this case, it is considered that the vehicle preferably executes an intervention stop control of decelerating and stopping the traveling vehicle. This allows the vehicle to decelerate and stop while traveling, regardless of the occupant's operation on the accelerator pedal or against the occupant's operation on the accelerator pedal. This presumably improves traveling safety of the vehicle.

CITATION LIST

Patent Literature

Patent Literature 1: Japanese Unexamined Patent Application Publication No. 2013-129228

Patent Literature 2: Japanese Unexamined Patent Application Publication No. 2019-142266

SUMMARY OF INVENTION

Problem to be Solved by the Invention

However, when executing such an intervention stop control, it is difficult for a vehicle to control cancellation of the intervention stop control, i.e., when to cancel and end the intervention stop control.

It is not that the vehicle may constantly continue the control until the vehicle is decelerated and stopped by, for example, the above-described intervention stop control. For example, even during an intervention control, an occupant can greatly steer a steering wheel based on, for example, his/her own determination for risk avoidance. In this case, if the vehicle constantly continues the intervention stop control until it decelerates and stops, the occupant can be unable to control the vehicle as expected, or a secondary hazard can be caused by a sudden stop that hinders traffic flow. The vehicle can be involved in an unexpected event. In addition, there is a possibility that an abnormality occurs in an in-vehicle sensor, such as an in-vehicle camera, provided in the vehicle. It is presumably undesirable that the vehicle constantly continue the intervention stop control until the vehicle decelerates and stops, based on inaccurate information of the in-vehicle sensor. In addition, Patent Literature 2 discloses cancelling an intervention control when an accelerator pedal is operated by an occupant during the intervention control.

On the other hand, when the intervention stop control is executed because, for example, the occupant mistakenly depresses the accelerator pedal hard as the brake pedal, the occupant can be surprised by how the vehicle responds to the operation. The occupant is likely to be surprised by how the vehicle responds to the operation, although it can be less surprising than if control is performed as it is when the accelerator pedal is mistakenly depressed hard as the brake pedal. The occupant in such a state is not always able to desirably operate an operation member as usual. The occupant in such a state is not always able to appropriately, as usual, perform an operation for a driving control for subsequent re-acceleration of the vehicle. If the vehicle executes the driving control of accelerating the vehicle based on an excessive operation input to the operation member by the occupant in such a state, there is a possibility that a secondary unexpected event further occurs for the occupant.

Thus, in a traveling control of a vehicle, it is desirable to improve an intervention control to be executed regardless of an occupant's operation on an operation member or against the occupant's operation on the operation member.

Means for Solving the Problem

A vehicle traveling control apparatus according to an embodiment of the invention includes an operation member and a controller. The operation member is to be operated by an occupant. The operation member is provided in a vehicle to operate traveling of the vehicle. The controller is configured to acquire operation information regarding an operation on the operation member by the occupant, and execute a traveling control including an acceleration or deceleration control of accelerating or decelerating the vehicle in accordance with the acquired operation information. The controller is configured to execute: an intervention stop control of decelerating and stopping the vehicle that is traveling, regardless of the operation on the operation member by the occupant or against the operation on the operation member by the occupant; an intervention cancellation control of cancelling the intervention stop control; and a driving control of accelerating the vehicle. In the driving control after cancelling the intervention stop control by the intervention cancellation control, the controller is configured to accelerate the vehicle by a second driving control that suppresses acceleration as compared with a first driving control of accelerating the vehicle in accordance with an operation amount on the operation member by the occupant. The vehicle includes an accelerator pedal serving as the operation member. When the controller has executed the intervention stop control by determining an abnormal operation regarding one or both of an operation speed and an operation amount on the accelerator pedal during the intervention stop control, the controller accelerates the vehicle by the second driving control in the driving control after cancelling the intervention stop control by the intervention cancellation control.

Effects of the Invention

In the embodiment of the invention, the controller executes the intervention cancellation control of cancelling the intervention stop control, together with the intervention stop control of decelerating and stopping the vehicle that is traveling, regardless of the occupant's operation on the operation member or against the occupant's operation on the operation member. This allows the vehicle to continue the control until the vehicle is decelerated and stopped by the intervention stop control, or is able to cancel the intervention stop control.

In addition, in the driving control to be executed to accelerate the vehicle after the intervention stop control is cancelled by the intervention cancellation control, the controller according to the embodiment of the invention is configured to accelerate the vehicle by the second driving control that suppresses acceleration as compared with the usual first driving control of accelerating the vehicle in accordance with the occupant's operation amount on the operation member. This suppresses sudden acceleration as usual of the vehicle, even if the occupant who has a sense of discomfort about the automobile traveling in accordance with an intervention control subsequently performs, for example, an operation to accelerate the vehicle in haste. This helps to prevent the occupant who has a sense of discomfort about the automobile traveling in accordance with the intervention control from having a secondary sense of discomfort. Thus, the occupant is able to regain a calm mind while the vehicle is being accelerated by the second driving control that suppresses acceleration. The occupant who has regained a calm mind is expected to appropriately operate the vehicle in a state of mind similar to a usual state of mind, not in haste.

In particular, in the present embodiment, in the intervention stop control, the controller may execute the intervention stop control by determining an abnormal operation regarding one or both of the operation speed and the operation amount on the accelerator pedal. In addition, in the present embodiment, when the controller has executed the intervention stop control by determining the abnormal operation, the controller accelerates the vehicle by the second driving control in the driving control after cancelling the intervention stop control by the intervention cancellation control. This allows the controller to execute the intervention stop control, and further to accelerate the vehicle by the second driving control in the driving control after cancelling the intervention stop control, when the occupant, for example, mistakenly depresses the accelerator pedal hard as the brake pedal.

As described above, the embodiment of the invention makes it possible to improve an intervention control to be executed regardless of an occupant's operation on an operation member or against the occupant's operation on the operation member.

BRIEF DESCRIPTION OF DRAWINGS

FIG. 1 is an explanatory diagram of an example of a traveling environment of an automobile according to a first embodiment of the invention.

FIG. 2 is an explanatory diagram of a control system that serves as a vehicle traveling control apparatus in the automobile in FIG. 1.

FIG. 3 is a basic configuration diagram of various control devices in FIG. 2.

FIG. 4 is a flowchart of a setting control for an intervention stop control to be executed by a CPU of an operation control device in FIG. 2.

FIG. 5 is a flowchart of the intervention stop control to be executed by a CPU of a braking control device in FIG. 2.

FIG. 6 is an explanatory diagram of an example of an intervention determination condition for an operation on an accelerator pedal by an occupant.

FIG. 7 is a flowchart of an intervention cancellation control to be executed by the CPU of the braking control device illustrated in FIG. 2.

FIG. 8 is a flowchart of a driving control to be executed by a CPU of a driving control device illustrated in FIG. 2.

FIG. 9 is an explanatory diagram of an example of acceleration suppression.

FIG. 10 is a flowchart of a driving control to be executed by a CPU of a driving control device of an automobile according to a second embodiment of the invention.

FIG. 11 is an explanatory diagram of a server apparatus that controls traveling of an automobile according to a third embodiment of the invention.

MODES FOR CARRYING OUT THE INVENTION

Some embodiments of the invention will be described below based on the drawings.

First Embodiment

FIG. 1 is an explanatory diagram of an example of a traveling environment of an automobile 1 according to a first embodiment of the invention.

In FIG. 1, the automobile 1 travels straight on a straight road. Here, the automobile 1 is an example of a vehicle. Examples of the vehicle also include a large bus, a truck, a motorcycle, a bicycle, and a personal mobility.

When traveling straight on a straight road, an occupant basically operates an accelerator pedal 22 to keep the current speed, and keeps a steering wheel 21 to travel along the road.

In such a situation, another automobile 2 can enter a traveling lane from a side of the road, as indicated by a broken line in the drawing. In this case, the occupant stops operating the accelerator pedal 22 and operates a brake pedal 23 to stop before the other automobile 2 at P1. This prevents the automobile 1 serving as an own vehicle from interfering with the other automobile 2.

In addition, an unillustrated traffic light at an intersection can change from blue to red. In this case, the occupant stops operating the accelerator pedal 22 and operates the brake pedal 23 at a timing that he/she determines as appropriate before the intersection, to stop before the intersection. This prevents the automobile 1 serving as the own vehicle from entering the intersection where the traffic light is red.

In this way, the automobile 1 travels based on an operation input to an operation member, such as the steering wheel 21, the accelerator pedal 22, or the brake pedal 23, by the occupant. Acceleration or deceleration and turning of the automobile 1 traveling basically correspond to an operation amount on the operation member by the occupant.

Incidentally, the occupant is not always able to appropriately operate the operation member in the traveling automobile 1. It is desirable that the automobile 1 be able to be controlled by intervention when the occupant performs an abnormal operation different from a normal operation. For example, the occupant can mistakenly operate the accelerator pedal 22 as the brake pedal 23. In this case, it is desirable that the automobile 1 execute an intervention stop control of decelerating and stopping the traveling automobile 1. This allows the automobile 1 to decelerate and stop while traveling, regardless of the occupant's operation on the accelerator pedal 22 or against the occupant's operation on the accelerator pedal 22. This presumably improves traveling safety of the automobile 1.

However, when executing such an intervention stop control, it is difficult for the automobile 1 to control cancellation of the intervention stop control, i.e., when to cancel and end the intervention stop control. It is not that the automobile 1 may constantly continue the control until the automobile 1 is decelerated and stopped by, for example, the above-described intervention stop control. For example, even during an intervention control, an occupant can greatly steer the steering wheel 21 based on, for example, his/her own determination for risk avoidance. In this case, if the automobile 1 constantly continues the intervention stop control until it decelerates and stops, the occupant can be unable to control the automobile 1 as expected. The automobile 1 can be involved in an unexpected event. In addition, there is a possibility that an abnormality occurs in an in-vehicle sensor, such as a vehicle outside camera 29, provided in the automobile 1. It is presumably undesirable that the automobile 1 constantly continue the intervention stop control until the automobile 1 decelerates and stops, based on inaccurate information of the in-vehicle sensor. In addition, Patent Literature 2 discloses cancelling the intervention control when the accelerator pedal 22 is operated by the occupant during the intervention control.

On the other hand, when the intervention stop control is executed because, for example, the occupant mistakenly depresses the accelerator pedal 22 hard as the brake pedal 23, the occupant can be surprised by how the automobile 1 responds to the operation. The occupant is likely to be surprised by how the automobile 1 responds to the operation, although it can be less surprising than if control is performed as it is when the accelerator pedal 22 is mistakenly depressed hard as the brake pedal 23. The occupant in such a state is not always able to perform a desirable operation as usual. The occupant in such a state is not always able to appropriately, as usual, perform an operation for a driving control for subsequent re-acceleration of the automobile 1. If the automobile 1 executes the driving control of accelerating the automobile 1 based on an excessive operation input to the operation member by the occupant in such a state, there is a possibility that a secondary unexpected event further occurs for the occupant. For example, a pedestrian is about to cross the road ahead of the intersection in FIG. 1. In this case, the occupant has to stop at P2 before the crossing pedestrian even in a surprised state.

Thus, in a traveling control of the automobile 1, it is desirable to improve the intervention control to be executed regardless of the occupant's operation on the operation member or against the occupant's operation on the operation member.

FIG. 2 is an explanatory diagram of a control system 10 that serves as a vehicle traveling control apparatus in the automobile 1 in FIG. 1.

The control system 10 in FIG. 2 includes multiple control devices and a vehicle network 17 to which the control devices are coupled. The vehicle network 17 may be the vehicle network 17 in conformity with a standard such as CAN (Controller Area Network) or LIN (Local Interconnect Network). In another example, the vehicle network 17 may be a network in conformity with IEEE (Institute of Electrical and Electronics Engineers) 802.3. The vehicle network 17 may also be a network in conformity with IEEE 802.15, or a network in which these are combined. The control devices are able to transmit and receive information to and from each other through the vehicle network 17.

FIG. 2 illustrates, as examples of the control devices, an operation control device 11, a driving control device 12, a braking control device 13, a steering control device 14, an in-vehicle sensor control device 15, and an external communication device 16. The control system 10 may include another control device.

Various operation members to be operated by the occupant in the automobile 1 are coupled to the operation control device 11. One or more operation members to be operated by the occupant may be provided in the automobile 1 to operate the traveling of the automobile 1. Here, examples thereof include the steering wheel 21, the accelerator pedal 22, the brake pedal 23, a shift lever 24, and a touch panel 25. The touch panel 25 may be used, for example, by the occupant to operate settings for the traveling of the vehicle. The operation control device 11 acquires the occupant's operation input to each operation member, and outputs operation information to another control device through the vehicle network 17.

Coupled to the driving control device 12 is a driving device 26 configured to drive wheels of the automobile 1, such as an engine, a motor, or a transmission. The driving control device 12 acquires control information regarding the driving from the vehicle network 17, and controls an operation state of the driving device 26. This allows the automobile 1 to accelerate or keep the speed. Note that the control information regarding the driving may mainly be generated periodically by the operation control device 11 in accordance with the occupant's operation amount on the accelerator pedal 22.

Coupled to the braking control device 13 is a braking device 27 configured to brake the wheels of the automobile 1, such as a brake or a regenerative device. The braking control device 13 acquires control information regarding the braking from the vehicle network 17, and controls an operation state of the braking device 27. This allows the automobile 1 to decelerate or stop. Note that the control information regarding the braking may mainly be generated periodically by the operation control device 11 in accordance with the occupant's operation amount on the brake pedal 23.

A steering device 28 is coupled to the steering control device 14. The steering control device 14 acquires control information regarding steering from the vehicle network 17, and controls an operation state of the steering device 28. This allows the automobile 1 to travel to the right or to the left. Note that the control information regarding the steering may mainly be generated periodically by the operation control device 11 in accordance with the occupant's operation amount on the steering wheel 21.

These driving control, braking control, and steering control allow the automobile 1 to travel based on and in accordance with the occupant's operation on the operation member. For example, the driving control device 12 may acquire information regarding the occupant's operation amount on the accelerator pedal 22, and execute an acceleration control of accelerating the automobile 1 in accordance with the acquired operation amount on the accelerator pedal 22. The braking control device 13 may acquire information regarding the occupant's operation amount on the brake pedal 23, and execute a deceleration control of decelerating the automobile 1 in accordance with the acquired operation amount on the brake pedal 23.

Various in-vehicle sensors provided in the automobile 1 are coupled to the in-vehicle sensor control device 15. Here, examples of the in-vehicle sensor include the vehicle outside camera 29, a vehicle outside Lidar 30, and an acceleration sensor 31.

The vehicle outside camera 29 may be provided to face forward in the automobile 1, for example, to capture an image of a range in front of the automobile 1 traveling.

The vehicle outside Lidar 30 may be provided to face forward in the automobile 1, for example, to detect, based on laser reflection, the range in front of the automobile 1 traveling. The vehicle outside Lidar 30 may generate spatial information regarding an object present in the range of detection, based on a laser reflection timing and a laser reflection input direction.

The acceleration sensor 31 detects the current acceleration rate of the traveling automobile 1. The acceleration sensor 31 may detect the acceleration rate in three orthogonal axial directions.

The in-vehicle sensor control device 15 acquires detection information from the various in-vehicle sensors provided in the automobile 1, and outputs the detection information to another control device through the vehicle network 17. In addition, the in-vehicle sensor control device 15 may process the detection information of the in-vehicle sensor, and output a result of the processing as the detection information to another control device through the vehicle network 17. For example, the in-vehicle sensor control device 15 may analyze a captured image of the vehicle outside camera 29 or spatial information regarding an object of the vehicle outside Lidar 30, generate the other automobile 2 or the pedestrian illustrated in FIG. 1, for example, and output the generated information as the detection information to another control device through the vehicle network 17. The in-vehicle sensor control device 15 may generate speed and direction information regarding the traveling of the automobile 1 and yaw, pitch, roll information indicating a behavior of the automobile 1, based on the acceleration rate detected by the acceleration sensor 31, and output the generated information as the detection information to another control device through the vehicle network 17.

The external communication device 16 establishes a wireless communication path with a base station 100 outside the automobile 1, and transmits and receives information to and from a server apparatus 101 using the established wireless communication path. Examples of the server apparatus 101 include one for ADAS, one provided by, for example, a manufacturer of the automobile 1, and one for emergency response. The external communication device 16 may transmit and receive information to and from these server apparatuses 101 as necessary.

FIG. 3 is a basic configuration diagram of various control devices 40 in FIG. 2.

The control device 40 in FIG. 3 includes an input-output port 41, a timer 42, a memory 43, a CPU (Central Processing Unit) 44, and a control bus 45 to which these are coupled. These devices coupled to the control bus 45 are able to supply and receive information to and from each other through the control bus 45.

Here, the braking control device 13 is used as an example for description.

To the input-output port 41 may be coupled various members illustrated in FIG. 2. For example, the vehicle network 17 and the braking device 27 may be coupled to the input-output port 41 of the braking control device 13. Note that the vehicle network 17 may be coupled to a dedicated in-vehicle input-output device separate from the input-output port 41.

The timer 42 measures time or the time.

The memory 43 holds a program to be executed by the CPU 44 and various types of information. The memory 43 may include, for example, a non-volatile semiconductor memory, a HDD, or a RAM.

The CPU 44 reads and executes the program held in the memory 43. Thus, in the control device 40, a controller that controls its operation is implemented.

Next, description is given of an intervention control for the occupant's operation by the control system 10 having such a configuration.

Mainly described here is an example of the intervention control in which an abnormal operation on the accelerator pedal 22 is performed by the occupant in the traveling automobile 1. Assumable examples of the abnormal operation on the operation member by the occupant also include an abnormal operation on the accelerator pedal 22 of the automobile 1 parked, and an abnormal operation on the brake pedal 23 or the steering wheel 21 of the traveling automobile 1.

The intervention control for the abnormal operation on the accelerator pedal 22 in the present embodiment basically includes a setting control for the intervention, an intervention stop control, and an intervention cancellation control. In the present embodiment, the intervention control is also performed in the driving control after cancellation of the intervention.

Here, the intervention stop control means a control of decelerating and stopping the traveling automobile 1, regardless of the occupant's operation on the operation member or against the occupant's operation on the operation member. Such an intervention stop control may be ended when the automobile 1 stops.

The intervention cancellation control means a control of cancelling the intervention stop control and ending the intervention stop control.

The driving control means a control of accelerating the automobile 1.

In the control system 10 in FIG. 2, for example, the CPU 44 of the braking control device 13 may execute the intervention stop control and the intervention cancellation control as its controller. In addition, for example, the CPU 44 of the driving control device 12 may execute the driving control as its controller. In addition, the CPU 44 of the operation control device 11 may execute the setting control for the intervention as its controller. In this case, in the control system 10 in FIG. 2, the CPUs 44 of the control devices cooperate with each other to execute the intervention control by the above-described series of controls. Note that the intervention control by the above-described series of controls may be executed by the CPU 44 of one control device 40 of the control system 10, for example, the CPU 44 of the braking control device 13.

FIG. 4 is a flowchart of the setting control for the intervention stop control to be executed by the CPU 44 of the operation control device 11 in FIG. 2.

The CPU 44 of the operation control device 11 repeatedly executes the setting control for the intervention stop control in FIG. 4 as the controller.

In step ST1, the CPU 44 determines whether or not a mode setting operation for the intervention control has been performed. For example, the occupant may operate a mode setting for the intervention control on a setting screen of the touch panel 25. The CPU 44 ends the control if the occupant has not performed a mode setting operation for the intervention control. In this case, the CPU 44 may set the intervention control to a normal mode as an initial setting. In contrast, if the occupant has performed an operation regarding the mode setting for the intervention control, the CPU 44 causes the process to proceed to step ST2.

Here, modes that may be set for the intervention control include the normal mode and an acceleration rate suppression mode.

The normal mode for the intervention control means a mode of restricting the intervention control to when the occupant's operation on the accelerator pedal 22 is a generally unusual abnormal operation and is an operation that desires execution of the intervention control.

The acceleration rate suppression mode for the intervention control means a mode in which the occupant's operation on the accelerator pedal 22 is determined as abnormal in a wider range than in the normal mode.

Note that the intervention control may be set to three or more modes.

In step ST2, the CPU 44 determines whether or not the occupant has performed a setting operation for the acceleration rate suppression mode.

If a setting operation for the acceleration rate suppression mode has not been performed, the CPU 44 causes the process to proceed to step ST3.

If a setting operation for the acceleration rate suppression mode has been performed, the CPU 44 causes the process to proceed to step ST4.

In step ST3, the CPU 44 sets the intervention control to the normal mode. The CPU 44 may record, in the memory 43, information indicating that the intervention control is set to the normal mode. The CPU 44 may also output information indicating that the intervention control is set to the normal mode to another control device of the control system 10 via the input-output port 41. Thereafter, the CPU 44 ends the control.

In step ST4, the CPU 44 sets the intervention control to the acceleration rate suppression mode. The CPU 44 may record, in the memory 43, information indicating that the intervention control is set to the acceleration rate suppression mode. The CPU 44 may also output information indicating that the intervention control is set to the acceleration rate suppression mode to another control device of the control system 10 via the input-output port 41. Thereafter, the CPU 44 ends the control.

In this way, the CPU 44 of the operation control device 11 may set the setting mode of the intervention control by switching between the normal mode and the acceleration rate suppression mode, based on the setting operation in the automobile 1 by the occupant.

Note that the CPU 44 of the operation control device 11 may acquire the setting mode of the intervention control set in advance by the occupant or the owner of the automobile 1, from the server apparatus 101 using the external communication device 16, and set the acquired setting mode.

FIG. 5 is a flowchart of the intervention stop control to be executed by the CPU 44 of the braking control device 13 in FIG. 2.

The CPU 44 of the braking control device 13 repeatedly executes the intervention stop control in FIG. 5 as the controller.

The CPU 44 of the braking control device 13 decelerates and stops the traveling automobile 1 by the intervention stop control illustrated in FIG. 5, regardless of the occupant's operation on the accelerator pedal 22 or against the occupant's operation on the accelerator pedal 22.

In step ST11, the CPU 44 determines whether or not the automobile 1 serving as the own vehicle is traveling. If the automobile 1 is parked or stopped, for example, the CPU 44 determines that the own vehicle is not traveling and ends the control. If the own vehicle is traveling, the CPU 44 causes the process to proceed to step ST12.

In step ST12, the CPU 44 acquires information from each unit of the control system 10 of the automobile 1 to determine whether or not intervention is necessary in the traveling automobile 1.

Note that the CPU 44 may acquire, from the memory 43, the information of each unit of the control system 10 of the automobile 1 already collected in the memory 43. In this case, the CPU 44 may execute a process of acquiring information of the vehicle network 17 and recording the information in the memory 43 in the background. Thus, the information collected and held in the memory 43 continues to be updated to the latest information.

Examples of the information to be used to determine whether or not intervention is necessary include information regarding the traveling environment of the automobile 1 serving as the own vehicle, information regarding a vehicle state, and information regarding an operation on the operation member by the occupant.

The information regarding the traveling environment may include, for example, a captured image of the outside of the vehicle captured by the vehicle outside camera 29, spatial information regarding the outside of the vehicle detected by the vehicle outside Lidar 30, and detection information, based on these, regarding a surrounding mobile body such as a preceding vehicle or the crossing person 3 near the intersection.

The information regarding the vehicle state may include information regarding the acceleration rate, the speed, and a body behavior of the own vehicle based on detection by the acceleration sensor 31. In addition, the information regarding the vehicle state may include abnormality information regarding the in-vehicle sensor such as the vehicle outside camera 29.

The information regarding the operation on the operation member by the occupant may include information regarding, for example, the operation amount and the operation speed on the accelerator pedal 22, the operation amount and the operation speed (a depression speed) on the brake pedal 23, and a steering direction and a steering amount (a steering angle) and a steering speed on the steering wheel 21.

In step ST13, the CPU 44 determines whether or not intervention is necessary in the traveling automobile 1, based on the information regarding the traveling environment, the vehicle state, and the operation by the occupant acquired in step ST12.

For example, the CPU 44 may determine whether or not the occupant has performed a normal operation as usual, based on the operation information. If the occupant has performed an abnormal operation instead of a normal operation, the CPU 44 causes the process to proceed to step ST14 to execute an intervention stop process of decelerating and stopping the traveling automobile 1.

In addition, the CPU 44 may determine whether there is an unusual abnormality in the vehicle behavior or the in-vehicle sensor, based on the information regarding the vehicle state. If there is an abnormality in the vehicle behavior or the in-vehicle sensor, the CPU 44 causes the process to proceed to step ST14 to execute the intervention stop process of decelerating and stopping the traveling automobile 1.

In addition, the CPU 44 may determine whether there is an obstacle to safe traveling when the own vehicle continues the current traveling or travels based on the operation, based on the information regarding the traveling environment. For example, as illustrated in FIG. 1, if the CPU 44 predicts that the other automobile 2 will enter the lane on which the own vehicle is traveling from the side of the road, or that the pedestrian will cross, the CPU 44 may determine that there is an obstacle to the traveling of the own vehicle traveling straight ahead. The CPU 44 may also determine that there is an obstacle to the traveling of the own vehicle if the CPU 44 predicts that there is a possibility of interference due to a lack of a time-to-collision (ttc) before a predicted timing of collision. In addition, if the CPU 44 predicts that a lap rate indicating a collision width in interference prediction will be greater than or equal to a threshold, the CPU 44 may determine that there is an obstacle to the traveling of the own vehicle. In this case, the CPU 44 causes the process to proceed to step ST14 to execute the intervention stop process of decelerating and stopping the traveling automobile 1.

If none of these is applicable, the CPU 44 ends the control. In this case, the CPU 44 ends the intervention stop control in FIG. 5 without executing the intervention stop process.

Note that the CPU 44 may vary what is determined and a criterion for whether or not intervention is necessary in the traveling automobile 1, between the normal mode and the acceleration rate suppression mode described above. For example, in the normal mode, the CPU 44 may predict and determine the presence or absence of an obstacle due to the other automobile 2 or the pedestrian in a range of a vehicle width in a direction of travel. In contrast, in the acceleration rate suppression mode, the CPU 44 may predict and determine the presence or absence of an obstacle due to the other automobile 2 or the pedestrian in a front range in the direction of travel of the own vehicle.

In step ST14, the CPU 44 acquires the setting mode for the intervention control from the memory 43, and determines whether the intervention control is set to the normal mode. If the intervention control is set to the normal mode, the CPU 44 causes the process to proceed to step ST15. If the intervention control is set to the acceleration rate suppression mode instead of the normal mode, the CPU 44 causes the process to proceed to step ST16.

In step ST15, the CPU 44 executes an interventional braking process in the normal mode. The CPU 44 actuates the braking device 27 to decelerate the own vehicle. Thereafter, the CPU 44 causes the process to proceed to step ST17.

In step ST16, the CPU 44 executes an interventional braking process in the acceleration rate suppression mode. The CPU 44 actuates the braking device 27 to decelerate the own vehicle. Thereafter, the CPU 44 causes the process to proceed to step ST17.

Note that the CPU 44 may make the deceleration in the intervention braking process in the normal mode and the deceleration in the intervention braking process in the acceleration rate suppression mode similar to each other, but preferably makes them different from each other. For example, in the acceleration rate suppression mode, the CPU 44 may be decelerated at a deceleration rate higher than in the normal mode by using a higher braking force.

In addition, a minimum deceleration rate in the interventional braking process may be a deceleration rate that allows the automobile 1 to stop within the duration of the ttc. However, the braking device 27 has a maximum deceleration rate at which the braking device 27 is able to brake the automobile 1. The CPU 44 may select any deceleration rate between them in accordance with the mode setting.

In step ST17, the CPU 44 determines whether or not the intervention has been started based on the determination of an abnormal operation. If the intervention has been started based on determination including an abnormal operation, the CPU 44 causes the process to proceed to step ST18. If the intervention has been started based on determination not including an abnormal operation, the CPU 44 causes the process to proceed to step ST19.

In step ST18, the CPU 44 provides a notification that the intervention stop control has been started based on the determination of an abnormal operation. For example, the CPU 44 may provide the notification by outputting abnormal operation determination information to the vehicle network 17 by setting an abnormal operation determination flag in the memory 43.

In step ST19, the CPU 44 determines whether or not the intervention stop control is to be ended.

For example, the CPU 44 may determine that the intervention stop control is to be ended when the automobile 1 is stopped by the intervention stop control. At this time, the CPU 44 may determine that the intervention stop control is to be ended when an elapsed time of the timer 42 after the automobile 1 is stopped exceeds a predetermined threshold. Here, the threshold for the elapsed time may be time it takes for the occupant who has performed an abnormal operation regains calmness and enters a nearly usual state, for example, time of about several seconds.

In addition, the CPU 44 may determine that the intervention stop control is to be interrupted and ended even if the automobile 1 is not stopped, when the intervention stop control is cancelled.

If the CPU 44 determines that the intervention stop control is to be ended, the CPU 44 ends the control.

If the CPU 44 does not determine that the intervention stop control is to be ended, the CPU 44 causes the process to proceed to step ST20.

In step ST20, the CPU 44 continues the intervention stop process started in step ST15 or step ST16. This causes the automobile 1 that has not been stopped to further decelerate.

Thereafter, the CPU 44 causes the process to return to step ST19. The CPU 44 repeats the processes from step ST19 to step ST20 until it determines that the intervention stop control is to be ended in step ST19. This allows the automobile 1 that has not been stopped to eventually stop.

FIG. 6 is an explanatory diagram of an intervention determination condition for the occupant's operation on the accelerator pedal 22.

In FIG. 6, the horizontal axis represents the occupant's depression time on the accelerator pedal 22. The vertical axis represents an accelerator position in a range of 0% to 100%.

The occupant usually depresses the accelerator pedal 22 basically slowly. In this case, a characteristic line indicating a change in the operation on the accelerator pedal 22 has a relatively gentle slope as indicated by C3 in the drawing. A depression speed is not high. In addition, the accelerator position does not instantaneously increase to 100% immediately after the occupant's operation.

In contrast, an occupant in haste, for example, can depress the accelerator pedal 22 faster and more greatly than usual. A characteristic line in this case is as indicated by C2.

In particular, a characteristic line when the accelerator pedal 22 is mistakenly depressed as the brake pedal 23 in haste is as indicated by C1.

For this reason, assumed as the intervention determination condition used to determine that the occupant's operation on the accelerator pedal 22 is abnormal may be, usually, a case where the accelerator position exceeds a dotted line Smax on the left side of a dotted line Tmin in the drawing. In the present embodiment, this criterion is used as an intervention determination condition in the normal mode. In this case, the CPU 44 determines an abnormal operation based on both the operation speed and the operation amount on the accelerator pedal 22. In the normal mode, the CPU 44 determines the characteristic line C1 in the drawing as an abnormal operation, and does not determine the characteristic lines C2 and C3 as an abnormal operation.

However, to also intervene in the operation in a state where the occupant has lost his/her calm mind, it is preferable to assume, as the intervention determination condition, also a case where the accelerator position exceeds the dotted line Smax on the right side of the dotted line Tmin in the drawing, in consideration of safety. In the present embodiment, this criterion is used as an intervention determination condition in the acceleration rate suppression mode. In this case, the CPU 44 determines an abnormal operation based on only the operation amount, which is one of the operation speed and the operation amount on the accelerator pedal 22. In the acceleration rate suppression mode, the CPU 44 determines the characteristic lines C1 and C2 in the drawing as an abnormal operation, and does not determine the characteristic line C3 as an abnormal operation.

This allows the CPU 44 to switch between determining an abnormal operation regarding both the operation speed and the operation amount on the accelerator pedal 22, and determining an abnormal operation regarding one of the operation speed and the operation amount on the accelerator pedal 22, in accordance with the mode setting for the intervention control.

FIG. 7 is a flowchart of the intervention cancellation control to be executed by the CPU 44 of the braking control device 13 in FIG. 2.

The CPU 44 of the braking control device 13 repeatedly executes the intervention cancellation control in FIG. 7 as the controller.

In step ST31, the CPU 44 determines whether or not the intervention stop control is intervening in the occupant's operation. If the intervention stop control in FIG. 5 is being executed, the CPU 44 determines that the intervention stop control is intervening, and causes the process to proceed to step ST32. If the intervention stop control in FIG. 5 is not being executed, the CPU 44 ends the control.

In step ST32, the CPU 44 acquires information from each unit of the control system 10 of the automobile 1 to determine cancellation of the intervention stop control.

Note that the CPU 44 may acquire, from the memory 43, the information of each unit of the control system 10 of the automobile 1 already collected in the memory 43. In this case, the CPU 44 may execute a process of acquiring information of the vehicle network 17 and recording the information in the memory 43 in the background. Thus, the information collected and held in the memory 43 continues to be updated to the latest information.

Examples of the information to be used to determine cancellation of the intervention stop control may include information regarding the vehicle state of the automobile 1 serving as the own vehicle and information regarding an operation on the operation member by the occupant. The examples may further include information regarding the traveling environment.

The information regarding the vehicle state may include information regarding the body behavior, such as a yaw rate, based on detection by the acceleration sensor 31, and the abnormality information regarding the in-vehicle sensor such as the vehicle outside camera 29.

The information regarding the operation on the operation member by the occupant may include information regarding, for example, the steering direction and the steering amount (the steering angle) and the steering speed on the steering wheel 21.

In step ST33, the CPU 44 determines whether or not an intervention is necessary in the traveling automobile 1, based on the information regarding the traveling environment, the vehicle state, and the operation by the occupant acquired in step ST32.

For example, the CPU 44 causes the process to proceed to step ST34 to cancel the intervention stop control, if the steering direction and the steering amount on the steering wheel 21 are greater than a threshold or the steering speed on the steering wheel 21 is higher than a threshold. The occupant can operate the steering wheel 21 to avoid interference or make a lane change based on his/her own determination.

In addition, the CPU 44 causes the process to proceed to step ST34 to cancel the intervention stop control, if the body behavior such as the yaw rate is greater than a threshold. When the steering wheel 21 is operated and the automobile 1 changes its direction greatly, the body behavior such as the yaw rate can become greater than the threshold.

In addition, if the traveling automobile 1 serving as the own vehicle can collide with, for example, another automobile, the CPU 44 determines in step ST33 that intervention is necessary in the traveling automobile 1. If the ttc used for this determination increases to greater than or equal to its cancellation threshold and a risk of collision is considered to have decreased, the CPU 44 causes the process to proceed to step ST34 to cancel the intervention stop control. Alternatively, if the overlap rate decreases to less than or equal to its cancellation threshold and the risk of collision is considered to have decreased, the CPU 44 causes the process to proceed to step ST34 to cancel the intervention stop control.

In addition, if there is an abnormality in the in-vehicle sensor such as the vehicle outside camera 29, the CPU 44 causes the process to proceed to step ST34 to cancel the intervention stop control executed based on the abnormality.

If none of these is applicable, the CPU 44 ends the intervention cancellation control in FIG. 7 without cancelling the intervention stop process.

Note that the CPU 44 may vary what is determined and a criterion for whether or not cancellation of the intervention in the automobile 1 during the intervention stop control is necessary, between the normal mode and the acceleration rate suppression mode described above. For example, in the acceleration rate suppression mode, the CPU 44 may determine that the intervention stop control is to be cancelled based on a threshold as a criterion higher than in the normal mode.

In step ST34, the CPU 44 determines whether or not a notification of the occupant's abnormal operation has been received from the ongoing intervention stop control in FIG. 5. If a notification of the occupant's abnormal operation has not been received, the CPU 44 causes the process to proceed to step ST35. If a notification of the occupant's abnormal operation has been received, the CPU 44 causes the process to proceed to step ST36.

In step ST35, the CPU 44 cancels the ongoing intervention stop control in FIG. 5. The CPU 44 determines that the intervention stop control is to be cancelled in step ST19 in FIG. 5, and ends the ongoing intervention stop control in FIG. 5. Thereafter, the CPU 44 ends the control. When ending the control, the CPU 44 may clear the abnormal operation determination flag in the memory 43.

In step ST36, the CPU 44 cancels the ongoing intervention stop control in FIG. 5. The CPU 44 determines that the intervention stop control is to be cancelled in step ST19 in FIG. 5, and ends the ongoing intervention stop control in FIG. 5. Thereafter, the CPU 44 causes the process to proceed to step ST37.

In step ST37, the CPU 44 provides a notification that acceleration is to be suppressed. The CPU 44 may notify the driving control device 12 that acceleration is to be suppressed by outputting the abnormal operation determination information to the vehicle network 17. Thus, when cancelling and stopping the intervention stop control executed based on the determination including an abnormal operation, the subsequent acceleration control by the driving control device 12 may be suppressed. The CPU 44 of the driving control device 12 may record, in the memory 43 of the driving control device 12, information indicating that a notification of the acceleration suppression has been received as, for example, an acceleration suppression flag. Thereafter, the CPU 44 of the braking control device 13 ends the control. When ending the control, the CPU 44 of the braking control device 13 may clear the abnormal operation determination flag in the memory 43.

FIG. 8 is a flowchart of the driving control to be executed by the CPU 44 of the driving control device 12 in FIG. 2.

The CPU 44 of the driving control device 12 repeatedly executes the driving control in FIG. 8 as the controller.

In step ST41, the CPU 44 acquires information from each unit of the control system 10 of the automobile 1 for the driving control.

Note that the CPU 44 may acquire, from the memory 43, the information of each unit of the control system 10 of the automobile 1 already collected in the memory 43. In this case, the CPU 44 may execute a process of acquiring information of the vehicle network 17 and recording the information in the memory 43 in the background. Thus, the information collected and held in the memory 43 continues to be updated to the latest information.

Examples of the information to be used to determine the driving control may include information regarding the operation amount on the accelerator pedal 22 by the occupant. The examples may further include information regarding the vehicle state of the automobile 1 serving as the own vehicle, and information regarding the traveling environment.

In step ST42, the CPU 44 determines whether or not an acceleration suppression notification has been received from the braking control device 13. If no acceleration suppression notification has been received, the CPU 44 causes the process to proceed to step ST43 for a normal driving control. If an acceleration suppression notification has been received, the CPU 44 causes the process to proceed to step ST44 for driving control with suppressed acceleration.

In step ST43, the CPU 44 controls the driving device 26 to generate a driving force corresponding to the operation amount on the accelerator pedal 22 by the occupant. This allows the CPU 44 to cause the automobile 1 to accelerate and travel in accordance with the operation amount on the accelerator pedal 22 by the occupant by a first driving control. When the CPU 44 has executed the intervention stop control with no abnormal operation on the accelerator pedal 22 determined in the intervention stop control, the CPU 44 is able to accelerate the automobile 1 as usual by the first driving control in the subsequent driving control even if the intervention stop control is cancelled by the intervention cancellation control. Thereafter, the CPU 44 ends the control.

In step ST44, the CPU 44 determines whether or not an elapsed time after cancelling the intervention stop control is greater than a predetermined threshold of several seconds. The threshold for the elapsed time here may be the same as the threshold used for the determination in step ST19. If the predetermined time has not elapsed, the CPU 44 causes the process to proceed to step ST45. In contrast, if the predetermined time has elapsed, the CPU 44 causes the process to proceed to step ST43. The CPU 44 controls the driving device 26 to generate a driving force corresponding to the operation amount on the accelerator pedal 22 by the occupant. At this time, the CPU 44 may clear the acceleration suppression flag held in the memory 43.

Note that, in step ST44, the CPU 44 may determine whether or not the number of times the driving control in FIG. 8 has been executed after cancelling the intervention stop control is greater than a threshold, instead of the elapsed time after cancelling the intervention stop control.

In another example, the CPU 44 may determine whether or not the number of operations on the accelerator pedal 22 after cancelling the intervention stop control is greater than a threshold. One operation on the accelerator pedal 22 here may be from when the accelerator pedal 22 is operated until when the accelerator pedal 22 is released from a foot to be no longer operated.

In step ST45, the CPU 44 acquires the setting mode for the intervention control from the memory 43, and determines whether the intervention control is set to the normal mode. If the intervention control is set to the normal mode, the CPU 44 causes the process to proceed to step ST46. If the intervention control is set to the acceleration rate suppression mode instead of the normal mode, the CPU 44 causes the process to proceed to step ST47.

Note that the CPU 44 may switch acceleration suppression in accordance with the lap rate in an event determined as causing interference, instead of switching the acceleration suppression based on the mode setting for the intervention control.

In step ST46, the CPU 44 controls the driving device 26 to generate a driving force that suppresses the acceleration rate. At this time, when the driving force corresponding to the operation amount on the accelerator pedal 22 by the occupant exceeds a threshold in the normal mode, the CPU 44 may suppress the driving force to the driving force as the threshold. This allows the automobile 1 to accelerate and travel with the driving force that suppresses the acceleration rate, regardless of the operation amount on the accelerator pedal 22 by the occupant. Even if the occupant in haste about the intervention stop control or a cause thereof suddenly depresses the accelerator pedal 22, the stopped automobile 1 starts to travel slowly at the suppressed acceleration rate. Thus, by a second driving control, the CPU 44 is able to cause the automobile 1 to accelerate and travel at the acceleration rate suppressed as compared with in the first driving control, regardless of the operation amount on the accelerator pedal 22 by the occupant. Thereafter, the CPU 44 ends the control.

In step ST47, the CPU 44 controls the driving device 26 to generate a driving force that further suppresses the acceleration rate than in the normal mode in step ST46. At this time, when the driving force corresponding to the operation amount on the accelerator pedal 22 by the occupant exceeds a threshold in the acceleration rate suppression mode, the CPU 44 may suppress the driving force to the driving force as the threshold. This allows the automobile 1 to accelerate and travel with the driving force that suppresses the acceleration rate as compared with in the normal mode, regardless of the operation amount on the accelerator pedal 22 by the occupant. Even if the occupant in haste about the intervention stop control or a cause thereof suddenly depresses the accelerator pedal 22, the stopped automobile 1 starts to travel slowly at the acceleration rate suppressed as compared with in the normal mode. Traveling of the automobile 1 upon re-acceleration is expected to be slower, making the traveling safer, than in the normal mode. Thus, by the second driving control, the CPU 44 is able to cause the automobile 1 to accelerate and travel at the acceleration rate suppressed as compared with in the first driving control, regardless of the operation amount on the accelerator pedal 22 by the occupant. Thereafter, the CPU 44 ends the control.

FIG. 9 is an explanatory diagram of an example of the acceleration suppression.

In FIG. 9, the horizontal axis represents the elapsed time after cancelling the intervention stop control. The vertical axis represents thresholds of the acceleration rate.

An upper characteristic curve in the drawing indicates the threshold of the acceleration rate at each elapsed time to be used for the second driving control in the normal mode. The threshold of the acceleration rate at the elapsed time is G1.

A lower characteristic curve in the drawing indicates the threshold of the acceleration rate at each elapsed time to be used for the second driving control in the acceleration rate suppression mode. The threshold of the acceleration rate at the elapsed time is G2. The threshold G2 of the acceleration rate is smaller than the threshold G1 of the acceleration rate.

In this way, the CPU 44 according to the present embodiment increases the threshold of the acceleration rate to be used in step ST46 or step ST47 of the second driving control, as the elapsed time after cancelling the intervention stop control becomes longer. This allows the automobile 1 to accelerate slowly, although regardless of the operation amount on the accelerator pedal 22 by the occupant.

At a timing of the threshold of the elapsed time in the normal mode, the CPU 44 increases the threshold of the acceleration rate to G1. In contrast, in the acceleration rate suppression mode, the CPU 44 increases the threshold of the acceleration rate to G2 smaller than G1.

Note that the characteristic curve indicating the increase in the acceleration rate may increase linearly, instead of increasing exponentially as illustrated in the drawing.

This allows the CPU 44 to suppress acceleration in the second driving control in the second driving control in the acceleration rate suppression mode, as compared with the second driving control in the normal mode. When the mode is set to the acceleration rate suppression mode, the CPU 44 determines an abnormal operation regarding only the operation amount, which is one of the operation speed and the operation amount on the accelerator pedal 22, in the intervention stop control. In contrast, when the mode is set to the normal mode, the CPU 44 determines an abnormal operation regarding both the operation speed and the operation amount on the accelerator pedal 22 in the intervention stop control.

Note that, in the process in FIG. 8, step ST45 may be unnecessary. In this case, the CPU 44 may accelerate the automobile 1 by suppressing the acceleration rate as compared with in the first driving control, in the second driving control in step ST46 or step ST47 after step ST44.

Even in this case, when the CPU 44 has executed the intervention stop control by determining an abnormal operation regarding one or both of the operation speed and the operation amount on the accelerator pedal 22 in the intervention stop control, the CPU 44 is able to slowly accelerate the automobile 1 by the second driving control until the elapsed time after cancelling the intervention stop control by the intervention cancellation control becomes greater than or equal to the threshold, in the driving control after cancelling the intervention stop control by the intervention cancellation control.

As described above, in the present embodiment, the CPU 44 serving as the controller executes the intervention cancellation control of cancelling the intervention stop control and ending the intervention stop control, together with the intervention stop control of decelerating and stopping the traveling automobile 1 and ending the control, regardless of the occupant's operation on the operation member or against the occupant's operation on the operation member. This allows the automobile 1 to continue the control until the automobile 1 is decelerated and stopped by the intervention stop control, or is able to cancel the intervention stop control.

In addition, in the driving control to be executed to accelerate the automobile 1 after the intervention stop control is cancelled by the intervention cancellation control, the CPU 44 according to the present embodiment is configured to accelerate the automobile 1 by the second driving control that suppresses acceleration as compared with the usual first driving control of accelerating the automobile 1 in accordance with the occupant's operation amount on the operation member, until the elapsed time after cancelling the intervention stop control by the intervention cancellation control becomes greater than or equal to the threshold. This suppresses sudden acceleration as usual of the automobile 1, even if the occupant who has a sense of discomfort about the automobile 1 traveling in accordance with the intervention control subsequently performs, for example, an operation to accelerate the automobile 1 in haste. This helps to prevent the occupant who has a sense of discomfort about the automobile 1 traveling in accordance with the intervention control from having a secondary sense of discomfort. Thus, the occupant is able to regain a calm mind while the automobile 1 is being accelerated by the second driving control that suppresses acceleration. The occupant who has regained a calm mind is expected to appropriately operate the automobile 1 in a state of mind similar to a usual state of mind, not in haste.

In particular, in the present embodiment, in the intervention stop control, the CPU 44 may execute the intervention stop control by determining an abnormal operation regarding one or both of the operation speed and the operation amount on the accelerator pedal 22. In addition, in the present embodiment, when the CPU 44 has executed the intervention stop control by determining the abnormal operation, the CPU 44 accelerates the automobile 1 by the second driving control in the driving control after cancelling the intervention stop control by the intervention cancellation control. This allows the CPU 44 to execute the intervention stop control, and further to accelerate the automobile 1 by the second driving control in the driving control after cancelling the intervention stop control, when the occupant, for example, mistakenly depresses the accelerator pedal 22 hard as the brake pedal 23.

As described above, the present embodiment makes it possible to improve the intervention control to be executed regardless of the occupant's operation on the operation member or against the occupant's operation on the operation member.

Second Embodiment

Next, a second embodiment of the invention will be described. Hereinafter, description is given mainly of differences from the above-described embodiment. Features similar to those in the above-described embodiment are denoted by the same reference numerals as those in the above-described embodiment and description thereof is omitted.

FIG. 10 is a flowchart of the driving control to be executed by the CPU 44 of the driving control device 12 of the automobile 1 according to the second embodiment of the invention.

In FIG. 10, steps representing processes similar to those in FIG. 8 are denoted by the same reference numerals as in FIG. 8 and description thereof is omitted.

As the controller, the CPU 44 of the driving control device 12 repeatedly executes the driving control in FIG. 10, and when the CPU 44 determines that the predetermined time has not elapsed in step ST44, causes the process to proceed to step ST51.

In step ST51, the CPU 44 determines whether or not the ongoing acceleration restriction is to be cancelled.

At this time, the CPU 44 may acquire information from each unit of the control system 10 of the automobile 1.

Examples of the information to be acquired here may include information regarding the traveling environment of the automobile 1 serving as the own vehicle, information regarding the vehicle state, and information regarding an operation on the operation member by the occupant.

The information regarding the traveling environment may include, for example, a captured image of the outside of the vehicle captured by the vehicle outside camera 29, spatial information regarding the outside of the vehicle detected by the vehicle outside Lidar 30, and detection information, based on these, regarding a surrounding mobile body such as a preceding vehicle or the crossing person 3.

The information regarding the vehicle state may include information indicating a state where an unillustrated turn signal lamp is being operated for a lane change or a right or left turn.

The information regarding the operation on the operation member by the occupant may include information regarding how the turn signal lamp is operated and whether or not the accelerator pedal 22 is operated.

Based on the acquired information, the CPU 44 determines whether or not the ongoing acceleration restriction is to be cancelled.

For example, if the traveling environment determined based on, for example, the captured image exhibits a change from a state where the intervention stop control has been determined to be executed, the CPU 44 determines that the ongoing acceleration restriction is to be cancelled, and causes the process to proceed to step ST43.

In addition, if the turn signal lamp of the automobile 1 is blinking by being operated by the occupant, the CPU 44 determines that the ongoing acceleration restriction is to be cancelled, and causes the process to proceed to step ST43.

In addition, if the occupant's operation on the accelerator pedal 22 is not continued after the execution of the intervention stop control, the CPU 44 determines that the ongoing acceleration restriction is to be cancelled, and causes the process to proceed to step ST43.

In step ST43, the CPU 44 causes the automobile 1 to travel by being accelerated by the driving force corresponding to the occupant's operation on the accelerator pedal 22.

If none of these is applicable, the CPU 44 causes the process to proceed to step ST45, and executes the speed suppression control after the cancellation of the intervention stop control.

Note that the CPU 44 may vary what is determined and a criterion for whether or not the ongoing acceleration restriction is to be cancelled, between the normal mode and the acceleration rate suppression mode described above. For example, in the acceleration rate suppression mode, the CPU 44 may determine that the ongoing acceleration restriction is to be cancelled based on a threshold as a criterion higher than in the normal mode.

Third Embodiment

Next, a third embodiment of the invention will be described. Hereinafter, description is given mainly of differences from the above-described embodiment. Features similar to those in the above-described embodiment are denoted by the same reference numerals as those in the above-described embodiment and description thereof is omitted.

In the present embodiment, the server apparatus 101 controls the traveling of the automobile 1.

FIG. 11 is an explanatory diagram of the server apparatus 101 that controls the traveling of the automobile 1 according to the third embodiment of the invention.

The server apparatus 101 in FIG. 11 includes a server communication device 102, a server timer 103, a server memory 104, a server CPU (Central Processing Unit) 105, and a server bus 106 to which these are coupled.

The server communication device 102 is coupled to a communication network such as the Internet. As illustrated in FIG. 2, the server communication device 102 transmits and receives data to and from the external communication device 16 of the automobile 1 traveling on the road through, for example, the base station 100 coupled to the communication network.

The server timer 103 measures time or the time.

The server memory 104 holds a programs to be executed by the server CPU 105 and data. The server memory 104 may include, for example, a non-volatile semiconductor memory, a HDD, or a RAM.

The server CPU 105 reads and executes the program held in the server memory 104. Thus, a controller is implemented in the server apparatus 101. The server CPU 105 serving as the controller of the server apparatus 101 manages operation of the server apparatus 101. The controller of the server apparatus 101 may serve as the vehicle traveling control apparatus of the automobile 1 to remotely control or assist in the traveling of the automobile 1. In this case, the server CPU 105 acquires various types of information from the automobile 1 using the server communication device 102, and transmits, to the automobile 1, information usable for the CPU 44 of the control system 10 of the automobile 1 to control the traveling of the own vehicle.

To control or manage the traveling of the automobile 1, the server CPU 105 serving as the vehicle traveling control apparatus may execute the setting control in FIG. 4, the intervention stop control in FIG. 5, the intervention cancellation control in FIG. 7, and the driving control in FIG. 8 using the information acquired from the automobile 1. In this case, the CPU 44 of the control system 10 of the automobile 1 may control the traveling of the own vehicle under the control of the server CPU 105 of the server apparatus 101.

Note that the server CPU 105 of the server apparatus 101 and the CPU 44 of the control system 10 of the automobile 1 may share the various controls described above and cooperate with each other to achieve the intervention control in the above-described embodiment.

The embodiments described above are preferred examples of embodiments of the invention. However, the invention is not limited to those, and various modifications and alternations may be made without departing from the scope of the gist of the invention.

In the above-described embodiment, the control system 10 of the automobile 2 or the server apparatus 101 serving as the vehicle traveling control apparatus is described as a main example in the intervention control when an abnormal operation on the accelerator pedal 22 is performed by the occupant.

In addition, for example, the control system 10 of the automobile 1 or the server apparatus 101 serving as the vehicle traveling control apparatus may execute the intervention control and the intervention cancellation control described above when an abnormal operation is performed on any of various operation members to be operated by the occupant to allow the automobile 2 to travel, including the steering wheel 21, the shift lever 24, the brake pedal 23, and a clutch pedal.

DESCRIPTION OF REFERENCE NUMERALS

1: automobile (vehicle), 2: another automobile, 3: crossing person, 11: operation control device, 12: driving control device, 13: braking control device, 14: steering control device, 15: in-vehicle sensor control device, 16: external communication device, 17: vehicle network, 21: steering wheel, 22: accelerator pedal (operation member), 23: brake pedal, 24: shift lever, 25: touch panel, 26: driving device, 27: braking device, 28: steering device, 29: vehicle outside camera, 30: vehicle outside Lidar, 31: acceleration sensor, 40: control device, 41: input-output port, 42: timer, 43: memory, 44: CPU, 45: control bus, 100: base station, 101: server apparatus, 102: server communication device, 103: server timer, 104: server memory, 105: server CPU, 106: server bus

The invention claimed is:

1. A vehicle traveling control apparatus comprising:

an operation member to be operated by an occupant, the operation member being provided in a vehicle to operate traveling of the vehicle; and a controller configured to acquire operation information regarding an operation on the operation member by the occupant, and execute a traveling control including an acceleration or deceleration control of accelerating or decelerating the vehicle in accordance with the acquired operation information, wherein the controller is configured to execute an intervention stop control of decelerating and stopping the vehicle that is traveling, regardless of the operation on the operation member by the occupant or against the operation on the operation member by the occupant, an intervention cancellation control of cancelling the intervention stop control when at least one of the following is satisfied:

an elapsed time after the vehicle stops is greater than or equal to a threshold;

a steering amount or a steering speed on a steering wheel serving as one of the operation members of the vehicle is greater than or equal to a threshold;

an in-vehicle sensor provided in the vehicle has an abnormality; and the vehicle exhibits a body behavior of greater than or equal to a threshold, based on a result of detection by the in-vehicle sensor provided in the vehicle, the body behavior including a yaw rate detected by an acceleration sensor that is the in-vehicle sensor, and a driving control of accelerating the vehicle, wherein the vehicle includes an accelerator pedal serving as the operation member, wherein, in the driving control after cancelling the intervention stop control by the intervention cancellation control, the controller is configured to accelerate the vehicle by a second driving control that suppresses acceleration as compared with a first driving control of accelerating the vehicle in accordance with an operation amount on the acceleration pedal by the occupant, wherein the controller is configured to set an intervention control mode including a normal mode and an acceleration rate suppression mode, wherein, in the normal mode, the controller is configured to determine an abnormal operation based on both an operation speed and an operation amount on the accelerator pedal, and wherein, in the acceleration rate suppression mode, the controller is configured to determine the abnormal operation based on one of the operation speed and the operation amount on the accelerator pedal, wherein, when the controller determines, during the intervention stop control, that there is the abnormal operation regarding one or both of the operation speed and the operation amount on the accelerator pedal, the controller is configured, after cancelling the intervention stop control, to accelerate the vehicle by the second driving control, wherein the suppression of acceleration by the second driving control limits the acceleration to a first threshold in the normal mode and to a second threshold in the acceleration rate suppression mode, the second threshold being lower than the first threshold, and wherein the first threshold and the second threshold are set to increase according to an elapsed time after the intervention stop control is cancelled.

2. The vehicle traveling control apparatus according to claim 1, wherein after cancelling the intervention stop control by the intervention cancellation control, the controller is configured to continuously accelerate the vehicle by the second driving control until an elapsed time after cancelling the intervention stop control becomes greater than or equal to a threshold, before the elapsed time becomes greater than or equal to the threshold, when the controller determines at least one of a condition that a change occurs from a situation in which the intervention stop control has been determined to be executed, a condition that a turn signal lamp of the vehicle is blinking, or a condition that no operation by the occupant is performed on the accelerator pedal after start of the execution of the intervention stop control, the controller is configured to stop accelerating the vehicle by the second driving control.

3. A vehicle acceleration control apparatus comprising:

an accelerator pedal to be operated by an occupant to request acceleration of a vehicle; and a controller configured to:

acquire operation information regarding an operation on the accelerator pedal by the occupant;

execute a first acceleration control of accelerating the vehicle in accordance with an operation amount on the accelerator pedal;

execute a second acceleration control of accelerating the vehicle by suppressing acceleration as compared with the first acceleration control;

execute an intervention stop control of decelerating and stopping the vehicle regardless of or against the operation on the accelerator pedal;

execute an intervention cancellation control of cancelling the intervention stop control when at least one of the following is satisfied:

an elapsed time after the vehicle stops is greater than or equal to a threshold;

a steering amount or a steering speed on a steering wheel is greater than or equal to a threshold;

an in-vehicle sensor provided in the vehicle has an abnormality; and the vehicle exhibits a body behavior of greater than or equal to a threshold, based on a result of detection by the in-vehicle sensor provided in the vehicle, the body behavior including a yaw rate detected by an acceleration sensor that is the in-vehicle sensor;

set an intervention control mode including a normal mode and an acceleration rate suppression mode;

in the normal mode, determine an abnormal operation based on both an operation speed and an operation amount on the accelerator pedal;

in the acceleration rate suppression mode, determine the abnormal operation based on one of the operation speed and the operation amount on the accelerator pedal; and when the controller determines, during the intervention stop control, that there is an abnormal operation regarding one or both of an operation speed and the operation amount on the accelerator pedal, accelerate the vehicle by the second acceleration control after cancelling the intervention stop control, wherein the second acceleration control limits the acceleration to a first threshold in the normal mode and to a second threshold in the acceleration rate suppression mode, the second threshold being lower than the first threshold, and wherein the first threshold and the second threshold are set to increase according to an elapsed time after the intervention stop control is cancelled.

4. The vehicle traveling control apparatus according to claim 1, wherein, in the intervention cancellation control, the controller cancels the intervention stop control when a time-to-collision used for determination of execution of the intervention stop control increases to greater than or equal to a cancellation threshold.

5. The vehicle traveling control apparatus according to claim 1, wherein, in the intervention cancellation control, the controller cancels the intervention stop control when an overlap rate indicating a collision width in interference prediction decreases to less than or equal to a cancellation threshold.

6. The vehicle traveling control apparatus according to claim 1, wherein, in the acceleration rate suppression mode, the controller decelerates the vehicle at a deceleration rate higher than in the normal mode in the intervention stop control.

* * * * *